(12) United States Patent
Gottwald

(10) Patent No.: US 9,222,390 B2
(45) Date of Patent: Dec. 29, 2015

(54) INJECTION DEVICE

(75) Inventor: Frank Gottwald, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 14/128,823

(22) PCT Filed: May 24, 2012

(86) PCT No.: PCT/EP2012/059722
§ 371 (c)(1),
(2), (4) Date: Dec. 23, 2013

(87) PCT Pub. No.: WO2012/175282
PCT Pub. Date: Dec. 27, 2012

(65) Prior Publication Data
US 2014/0116545 A1    May 1, 2014

(30) Foreign Application Priority Data
Jun. 22, 2011   (DE) .......................... 10 2011 077 953

(51) Int. Cl.
*F01N 3/00* (2006.01)
*F01N 3/20* (2006.01)

(52) U.S. Cl.
CPC .............. *F01N 3/208* (2013.01); *F01N 3/2066* (2013.01); *F01N 2610/02* (2013.01); *F01N 2610/1433* (2013.01); *F01N 2610/1486* (2013.01);
(Continued)

(58) Field of Classification Search
CPC ............. F01N 3/08; F01N 3/10; F01N 3/208; F01N 2610/01; F01N 2610/02; F01N 2610/14; F01N 2610/1426; F01N 2610/1433; F01N 2610/1473; F01N 2610/148; F01N 3/2066; F01N 2610/1486; F01N 2610/1493; B01F 3/00; B01D 53/94; Y02T 10/24; Y10T 137/85954
USPC .................. 60/272–324; 137/563.14, 563.13, 137/563.15, 563.16; 251/335.1
See application file for complete search history.

(56) References Cited

U.S. PATENT DOCUMENTS

| 4,860,848 A * | 8/1989 | Barth et al. ................... 180/197 |
| 2010/0200786 A1* | 8/2010 | Chen .............................. 251/73 |

FOREIGN PATENT DOCUMENTS

| DE | 102006060838 | 6/2008 |
| DE | 102008009650 | 8/2009 |
| DE | 102008009650 A1 * | 8/2009 |

(Continued)

OTHER PUBLICATIONS

DE 102008009650 A1 Translation, Vogel, Aug. 27, 2009.*
(Continued)

*Primary Examiner* — Jesse Bogue
*Assistant Examiner* — Kelsey Stanek
(74) *Attorney, Agent, or Firm* — Michael Best & Friedrich LLP

(57) ABSTRACT

The invention relates to a device for injecting a fluid (2), in particular into the exhaust-gas section of an internal combustion engine, having a reservoir (4) for storing the fluid (2) to be injected; an injection and metering module (10); a pump (8) which is configured for conveying fluid (2) during operation out of the reservoir (4) to the injection and metering module (10); and a return line (16) which makes an outflow of fluid (2) out of the injection and metering module (10) possible, wherein a switchable throttling valve (14) which is suitable for pumping fluid out of the injection and metering module (10) is arranged in the return line (16).

11 Claims, 3 Drawing Sheets

(52) U.S. Cl.
CPC .......... *F01N2610/1493* (2013.01); *Y02T 10/24* (2013.01); *Y10T 137/86027* (2015.04)

(56) References Cited

FOREIGN PATENT DOCUMENTS

| DE | 102008000594 A1 | * | 9/2009 |
| DE | 102009029534 | | 3/2011 |
| DE | 102009029534 A1 | * | 3/2011 |

OTHER PUBLICATIONS

DE 102008000594 A1 Translation, Liskow, Sep. 17, 2009.*
DE 102009029534 A1 Translation, Glaser, Mar. 24, 2011.*
International Search Report for Application No. PCT/EP2012/059722 dated Sep. 6, 2012 (English Translation, 2 pages).

* cited by examiner

INJECTION DEVICE

BACKGROUND OF INVENTION

The invention relates to a multifunctional device for injecting a fluid, in particular into the exhaust tract of an internal combustion engine.

It is known to inject aqueous urea solution (AdBlue®) into the exhaust tract of internal combustion engines, in particular diesel engines, in order to reduce the nitrogen oxides contained in the exhaust gases. If a delivery module provided for injecting the aqueous urea solution into the exhaust tract has a pump with a non-volumetric delivery action, a return line is required in order for excess amounts of urea solution delivered by the pump to be delivered from the pressure side of the pump back to the suction side, and for the injection pressure to be kept constant. A variable throttle is preferably provided in the return line such that the injection pressure can be adjusted by variation of the throttle cross section.

To remove air (bubbles) from the delivery module, it is necessary for the return line to be fully closed.

To make the delivery module resistant to ice pressure, it is known for a small amount of air to be sucked in through the injection opening in a pulsed manner, and for an air-filled compensation volume for the aqueous urea solution to thus be created in the delivery module. To trigger such a pulsed sucking-in process, the cross section of the controllable throttle which is arranged in the return line is enlarged very quickly (for example within approximately 40 ms) by a factor of more than 100.

The three described functions (pressure regulation, venting of the delivery module and sucking-in of air in order to improve resistance to ice pressure) may be realized by means of a 2/3 directional valve that has two ports and the stated three functions.

In addition to the stated three functions, there is often a requirement for the injection system to be fully evacuated. For this purpose, use is conventionally made of the pump that is provided for the injection of the fluid during normal operation. For this purpose, by means of an additional 4/2 directional valve, the pump is switched such that the inlet and outlet of said pump are interchanged, and the urea solution is sucked out of the delivery module, and delivered back into the tank, by operation of the pump.

In an injection system of said type, two switchable valves, a 2/3 directional valve and a 4/2 directional valve, are required in order to realize the desired four functions.

SUMMARY OF THE INVENTION

It is an object of the invention to provide an injection system which is of simple construction and by means of which the stated functions, including a complete evacuation of the system, can be realized.

A device according to the invention for injecting a fluid, in particular into the exhaust tract of an internal combustion engine, has a reservoir for storing the fluid to be injected, has an injection and dosing module designed to inject the fluid into the exhaust tract, and has a pump designed such that, during operation, it delivers fluid from the reservoir to the injection and dosing module. A return line is also provided through which excess fluid can be discharged from the injection and dosing module. In the return line there is arranged a switchable throttle valve which can be operated in a pumping mode in which the throttle valve acts as a pump and pumps fluid out of the injection and dosing module.

By virtue of the fact that, according to the invention, the throttle valve is suitable for pumping fluid out of the injection and dosing module, it is possible to dispense with an additional switchable valve that switches the pump between an injection mode for injecting the fluid into the exhaust tract and a suction mode for sucking the fluid out of the injection and dosing module. A device according to the invention can therefore be realized more easily and at lower cost than the injection devices known from the prior art.

In one embodiment, the throttle valve can be switched into further operating states in which the throttle valve is selectively fully closed, fully open or partially open. By means of a switchable throttle valve of said type, alternatively to the pumping-out of the fluid (pumping mode), the injection pressure in the injection and dosing module can be controlled and/or regulated (throttle valve partially open), the injection and dosing module can be vented (throttle valve fully closed), and/or air can be sucked into the injection and dosing module in pulsed fashion (throttle valve fully open) in order to increase the resistance thereof to ice pressure. By means of a throttle valve of said type, all of the functions required during operation can be realized by means of a single valve. In particular, it is possible to dispense with a second valve for switching the delivery direction of the pump.

In one embodiment, the throttle valve has a throttle chamber with at least one first port and at least one second port, wherein a movable throttle element is arranged in the throttle chamber. The throttle valve can be closed and fully or partially opened by movement of the throttle element in the throttle chamber. In particular, by means of a dosed movement of the throttle element, the opening cross section of the throttle valve can be variably adjusted in order to set the injection pressure to a desired value.

In one embodiment, the throttle valve has in each case one check valve in the first port and in the second port respectively into and out of the throttle chamber, which check valve defines the possible flow direction in the first port and in the second port respectively and prevents a fluid flow counter to the defined delivery direction. Check valves arranged in the first port and in the second port make it possible for the throttle valve to be operated as a pump by means of a continuous oscillating movement of the throttle element, and thus for the function of pumping fluid out of the injection and dosing module to be realized by means of the throttle valve, without an external pump being used for this purpose. In this case, the throttle element performs the function of a pump piston.

In one embodiment, the throttle chamber is delimited, and closed off in a fluid-tight manner, on at least one side by a flexible diaphragm. A flexible diaphragm makes it possible for the throttle chamber to be reliably sealed off, and for leaks through which fluid could escape from the throttle chamber to be eliminated. Owing to the flexibility of the diaphragm, it is possible for the volume of the throttle chamber to be varied by movement of the diaphragm.

In one embodiment, at least one spring element is provided which is designed to push the throttle element into its closed position in which no fluid flow through the throttle valve is possible. By means of a spring element of said type, the throttle valve is reliably closed when it is not actuated.

In one embodiment, a drive, which is for example in the form of a linear magnet drive, is provided for moving the throttle element from its closed position into an open position during operation. By means of dosed actuation of the drive, the throttle element can be moved into a desired open position in a precise manner. This makes it possible to set a desired opening cross section at the throttle valve in order to realize a predefined injection pressure.

The invention also encompasses a method for operating a device according to the invention, wherein the method includes pumping fluid out of the injection and delivery module by means of suitable actuation of the throttle valve. The injection and delivery module can thus be fully evacuated without an external pump and without an additional valve for switching the pumping direction of the injection pump.

In one embodiment, the method according to the invention additionally includes adjusting the pressure in the injection and dosing module by partially opening the throttle valve in a controlled manner. The injection pressure can thus also then be set to a desired value in a precise manner if the injection and delivery pump is not a pump with a volumetric delivery action.

One embodiment of the method includes sucking air into the injection and dosing module by deactivating the pump and fully opening the throttle valve, in order to create an air volume in the injection and dosing module and thus increase the resistance of the injection and dosing module to ice pressure.

One embodiment of the method additionally includes fully closing the throttle valve in order to vent the injection and dosing module.

BRIEF DESCRIPTION OF THE DRAWINGS

The invention will be explained in more detail below on the basis of the appended figures, in which.

DETAILED DESCRIPTION

Figure 1:
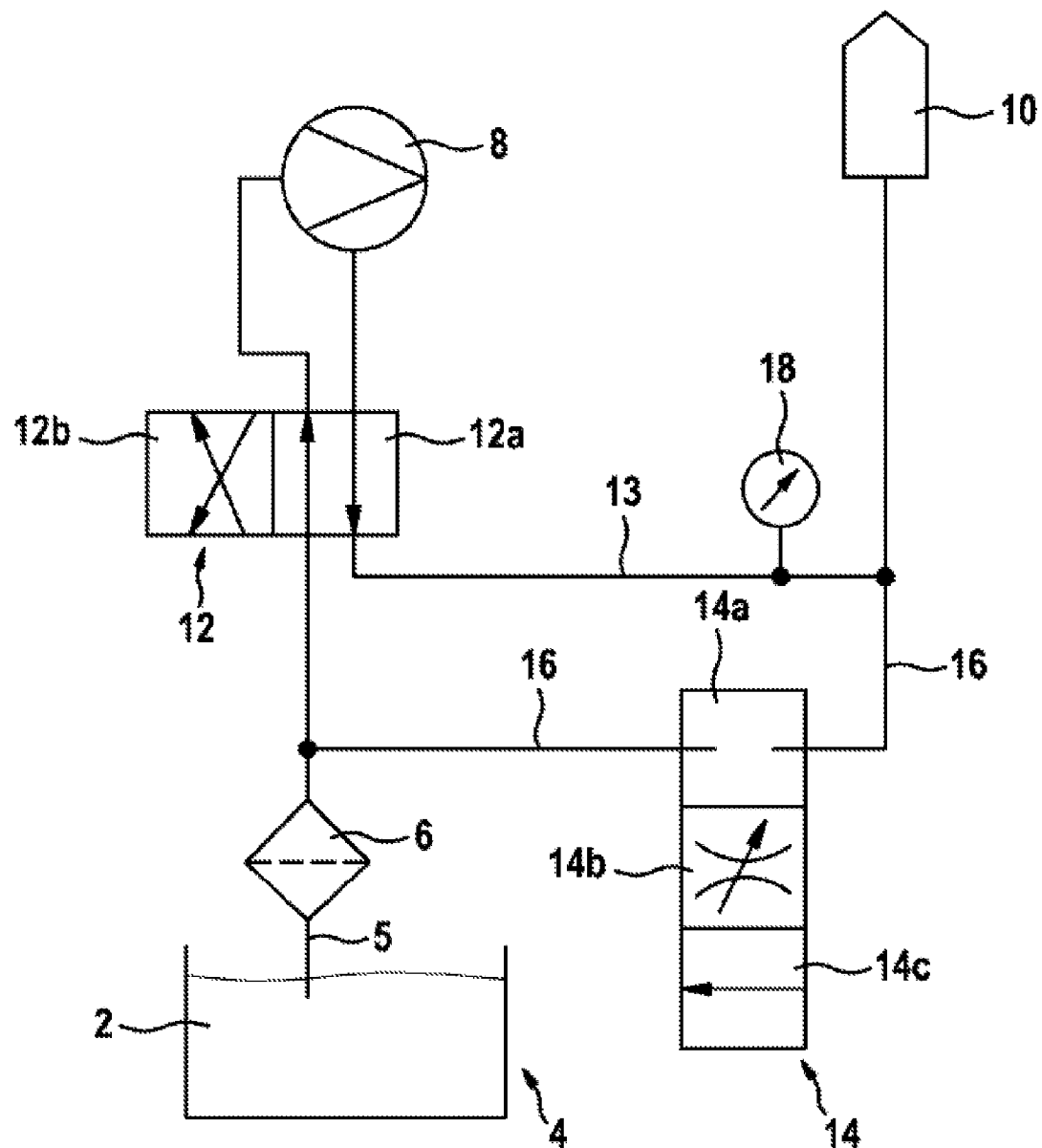
FIG. 1 shows a schematic block diagram of a conventional injection device.

FIG. 1 shows a schematic block diagram of a conventional device for injecting a fluid 2.

The device has a reservoir 4 in which the fluid 2 to be injected is stored. The fluid 2 to be injected is extracted from the reservoir 4 via a fluid extraction line 5 in which a filter 6 is arranged, and said fluid is supplied to the inlet of a pump 8 through a 4/2 directional switching valve 12 which, during normal operation, is switched into a first position 12a. The pump pressurizes the fluid 2 and conducts the fluid 2 to be injected at elevated pressure through a second duct of the 4/2 directional switching valve 12 to the injection and dosing module 10, the latter being arranged on an exhaust tract (not shown) and being designed to inject the fluid supplied to it into the exhaust tract. The pressure of the fluid can be continuously measured and monitored by means of a pressure sensor 18 arranged in or on the supply line 13.

Also connected to the injection and dosing module 10 is a return line 16 which makes it possible for fluid to be conducted from the injection and dosing module 10 back to the inlet side of the pump 8 and/or into the reservoir 4. In the return line 16 there is arranged a 2/3 directional throttle valve 14 which can be switched between the following three states: 14a—shutting-off of the return line, 14b—dosing function for setting a desired setting pressure, and 14c—complete opening for pulsed suction of air. One of the three operating states can selectively be set by switching the throttle valve 14 in the return line 16. In the dosing function 14b, the opening cross section of the throttle valve 14 can be varied in order to set a desired injection pressure.

In order to pump fluid out of the injection and dosing module 10 when required, the 4/2 directional switching valve 12 is switched into the second operating state 12b, in which the injection and dosing module 10 is connected to the inlet of the pump 8 and the filter 6 is connected to the outlet of the pump 8 such that, by operation of the pump 8, fluid is sucked out of the injection and dosing module 10 and pumped back into the reservoir 4 through the filter 6.

In the case of a device of said type, in addition to the throttle valve 14, a second switchable valve 12 is required in order to enable fluid to be pumped out of the injection and dosing module 10.

Figure 2:
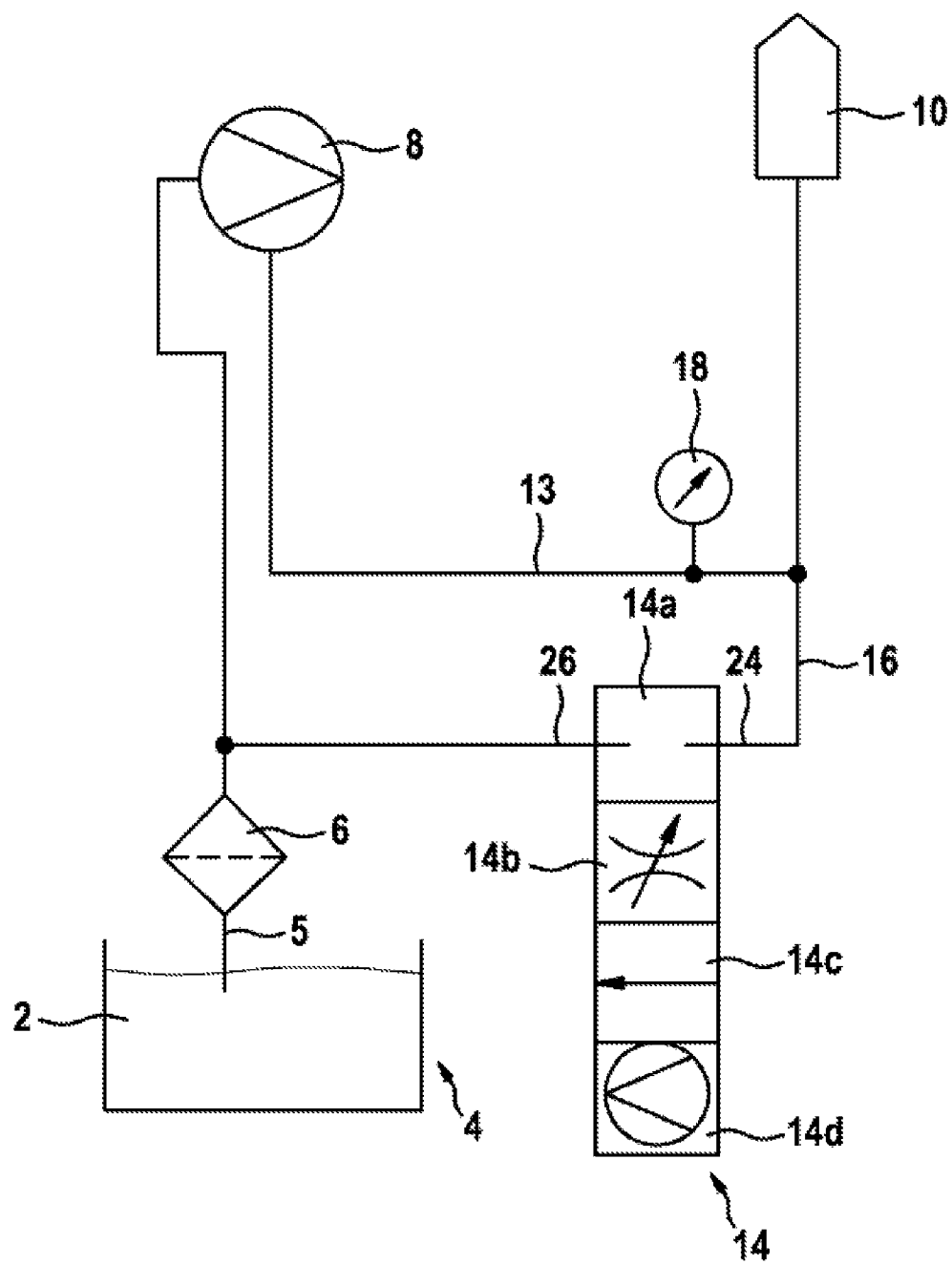
FIG. 2 shows a schematic block diagram of an injection device according to the invention.

FIG. 2 shows a schematic block diagram of an exemplary embodiment of an injection device according to the invention.

Those constituent parts of the injection device which correspond to the constituent parts of a conventional injection device such as is shown in FIG. 1 are denoted by the same reference signs and will not be described in detail again. Instead, reference is made to the description of FIG. 1.

An injection device according to the invention does not have a 4/2 directional switching valve 12 in order to connect the inlet and the outlet of the pump 8 selectively to the filter 6 or to the injection and dosing module 10. Instead, the inlet of the pump 8 (suction line) is connected permanently, that is to say without an interposed (switching) valve, to the filter 6, and the outlet of the pump 8 (pressure line) is connected permanently to the injection and dosing module 10.

An injection device according to the invention has a modified throttle valve 14 which is in the form of a 2/4 directional throttle valve 4 with two ports and four functions. In addition to the three functions of a conventional throttle valve 14, such as have been described in conjunction with FIG. 1, a 2/4 directional throttle valve 14 according to the invention can be switched into a pumping mode 14d. In the pumping mode 14d, it is made possible for fluid to be pumped out of the injection and dosing module 10 to the inlet of the pump 8, or back into the reservoir 4 through the filter 6.

Figure 3:
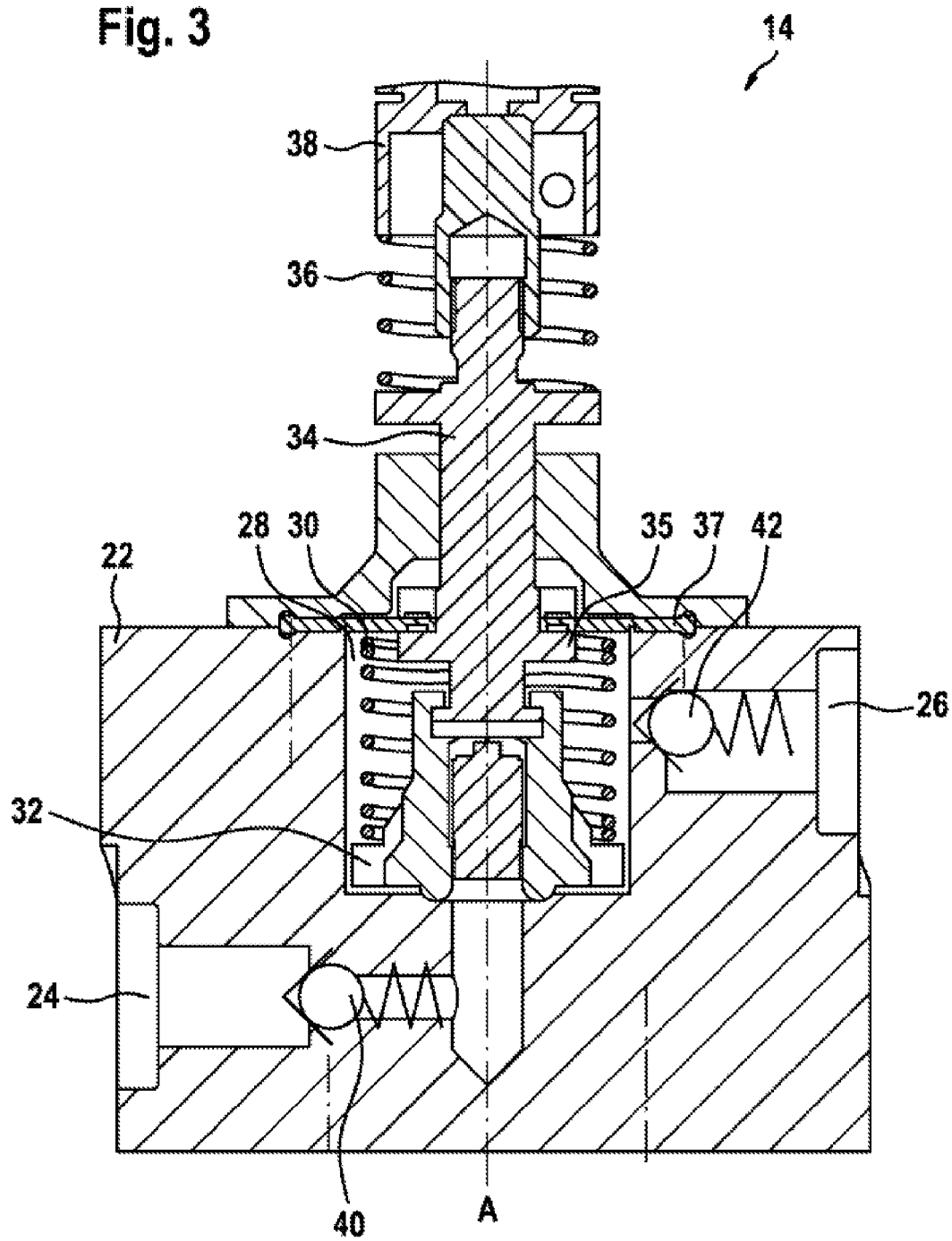
FIG. 3 shows a schematic sectional view through a 2/4 directional throttle valve according to the invention.

FIG. 3 shows a sectional view of a 2/4 directional throttle valve 14 according to the invention.

The throttle valve 14 has a valve plate 22 in which, as shown in FIG. 2, there are formed a valve chamber 28, a first port 24 which in the assembled state is connected to the injection and dosing module 10, and a second port 26 which in the assembled state is connected to the inlet of the pump 8 and to the filter 6.

In the valve chamber 28 there is arranged a valve body 32 which is movable along an axis A. The point at which the first port 24 issues into the valve chamber 28 can be selectively opened and closed by movement of the valve body 32. In particular, the cross section of the opening and thus the throttling action of the throttle valve 14 can be variably adjusted by movement of the valve body 32 between a fully open state and a fully closed state.

The valve body 32 is mechanically connected to a slide 34 such that, by movement of the slide 34, the valve body 32 can be moved parallel to the axis A between the closed position and an open position. The slide 34 is guided to the outside through a flexible diaphragm 37 by means of which one side of the valve chamber 28 is delimited and closed off in a fluid-tight manner, and said slide can be driven by an external drive 38, which is for example in the form of a linear magnet drive.

In the rest state, that is to say when the drive 38 is deactivated, spring elements 30, 36 which are arranged in the form of spiral springs around the valve element 32 and the slide 34 and which are supported on these push the valve element 32 and the slide 34 respectively into the closed position, in which the first port 24 into the throttle chamber 28 is closed off in a fluid-tight manner by the valve element 32.

A projection 35 formed on the slide 34 interacts with the flexible diaphragm 37 that delimits at least one side of the valve chamber 28, such that, when the slide 34 is moved from the closed position into an open position (from bottom to top in the illustration of FIG. 3), the diaphragm 37 is turned out toward the outer side situated opposite the valve chamber 28. As a result of the flexible diaphragm 37 being turned out, the volume of the valve chamber 28 is enlarged, and the pressure in the valve chamber 28 is reduced.

In the first port 24 into the valve chamber 28, there is arranged a first check valve 40 which permits a fluid flow from the first port 24 into the valve chamber 28 and prevents a return flow of fluid from the valve chamber 28 into the first port 24.

Likewise, in the second port 26 out of the valve chamber 28, there is provided a second check valve 42 which permits a fluid flow out of the valve chamber 28 into the second port 26 and prevents a fluid flow from the second port 26 into the valve chamber 28.

When the drive 38 is deactivated, the valve body 32 and the slide 34 are pushed by the spring elements 30, 36 (downward) into the closed position in which the throttle valve 14 is fully closed, for example in order to enable the injection device to be fully vented.

Activation of the drive 38 causes the slide 34 and the valve element 32 to be moved (upward) into an open position. Abrupt complete opening of the throttle valve 14 with a fast movement of the valve body 32 into the fully open position causes air to be sucked into the injection and dosing module 10 in a pulsed manner, whereby there is created in the latter an elastic air volume which can receive the additional volume of freezing fluid and which thereby increases the resistance of the injection and dosing module 10 to ice pressure.

The throttle function of the throttle valve 14 can be realized by means of an incomplete opening of the throttle valve 14. Precise actuation of the throttle valve 14 in an incompletely opened state makes it possible to set a desired injection pressure in the injection and dosing module 10.

The pump function according to the invention of the throttle valve 14 can be realized by periodic movement of the slide 34. If the slide 34 is moved (upward) in the direction of the drive 38 by actuation of the drive 38, not only is the valve body 32 moved into an open position, but it is also the case that the flexible diaphragm 37 is turned outward and the volume of the valve chamber 28 is enlarged.

Owing to the pressure drop in the valve chamber 28 caused by the enlargement of the volume of the valve chamber 28, fluid 2 flows out of the first port 24 into the valve chamber 28 through the check valve 40 which opens in said flow direction. After the valve chamber 28 has been filled with fluid in this way, the slide 34 is, by corresponding actuation of the drive 38 or after the deactivation of the drive 38, moved in the opposite direction (downward) by the force of the spring elements 30, 36. In this case, the elastic diaphragm 37 that is connected to the slide 34 is also moved downward in the direction of the valve plate 22 and, in so doing, reduces the volume of the valve chamber 28. The reduction of the volume of the valve chamber 28 causes the pressure in the valve chamber 28 to be increased, and the fluid flows out of the valve chamber 28 into the second port 26 through the second check valve 42 arranged in the second port 26, and flows from there to the inlet side of the pump or back into the fluid reservoir 4 (see FIG. 2).

By virtue of the slide 34 being periodically driven in an oscillating movement, it is thus possible to realize a pumping function, and fluid can be pumped out of the first port 24 into the second port 26 through the pump chamber 28. The two check valves 40, 42 are preferably designed such that they can be opened with the least possible force or least possible fluid pressure, in order that they constitute a negligible resistance during the "pulsed back-suction" function, in which fast opening of the valves is of importance.

Owing to the flexible diaphragm 37, the volume of the valve chamber 28 is variable. In particular, the volume of the valve chamber 28 can increase, by expansion of the diaphragm 37, if the fluid in the pump chamber 28 freezes. The invention thus provides an injection device with a throttle valve 14 which is resistant to ice pressure.

The expansion according to the invention of the controllable throttle valve 14 from a 2/3 directional throttle valve 14 to a 2/4 directional throttle valve 14 with additional pumping function reduces considerably the outlay and the costs for an injection device which permits a suction of fluid out of the injection and dosing module 10.

What is claimed is:

1. A device for injecting a fluid (2), the device comprising:
   a reservoir (4) for storing the fluid (2) to be injected;
   an injection and dosing module (10);
   a pump (8) which, during operation, delivers the fluid (2) from the reservoir (4) to the injection and dosing module (10); and
   a return line (16) which permits an outflow of fluid (2) from the injection and dosing module (10), wherein a switchable throttle valve (14) operable as a pump for pumping fluid out of the injection and dosing module (10) is arranged in the return line (16),
   wherein, alternatively to pumping fluid out of the injection and dosing module, the throttle valve is further configured to selectively operate in a fully closed state, a fully opened state, and a partially opened state.

2. The device as claimed in claim 1, wherein the throttle valve (14) has a valve chamber (28) with at least one first port (24) and with at least one second port (26), and has a valve body (32) which is movable in the valve chamber (28).

3. The device as claimed in claim 2, wherein the throttle valve (14) has in each case one check valve (40, 42) in the first and second ports (24, 26).

4. The device as claimed in claim 2, wherein the valve chamber (28) is closed off in a fluid-tight manner on at least one side by a flexible diaphragm (37), wherein the diaphragm (37) can be moved by means of a drive (38) in order to vary the volume of the valve chamber (28).

5. The device as claimed in claim 2, wherein the throttle valve (14) has at least one spring element (30, 36) designed to push the valve body (32) into a closed position.

6. A method for operating a device as claimed in claim 1, wherein the method includes pumping the fluid (2) out of the injection and dosing module (10) by means of suitable actuation of the throttle valve (14).

7. The method for operating a device, as claimed in claim 6, wherein the method additionally includes adjusting pressure in the injection and dosing module (10) by partially opening the throttle valve (14).

8. The method for operating a device, as claimed in claim 6, wherein the method additionally includes sucking air into the injection and dosing module (10) by deactivating the pump (8) and fully opening the throttle valve (14).

9. The method for operating a device, as claimed in claim 6, wherein the method includes fully closing the throttle valve (14) in order to vent the injection and dosing module (10).

10. The device as claimed in claim 2, wherein the throttle valve (14) has a linear magnet (38) designed to move the valve body (32) from the closed position into an open position.

11. The device as claimed in claim 10, wherein the throttle valve (14) has at least one spring element (30, 36) designed to push the valve body (32) into a closed position.

\* \* \* \* \*